United States Patent [19]
Haines

[11] Patent Number: 5,420,735
[45] Date of Patent: May 30, 1995

[54] HARD DISK DRIVE HAVING PARTIAL CONTACT MAGNETIC RECORDING SLIDER APPARATUS

[75] Inventor: William G. Haines, Longmont, Colo.

[73] Assignee: Maxtor Corporation, San Jose, Calif.

[21] Appl. No.: 69,991

[22] Filed: May 28, 1993

[51] Int. Cl.⁶ .................. G11B 5/60; G11B 17/32
[52] U.S. Cl. ............................................. 360/103
[58] Field of Search ...................................... 360/103

[56] References Cited

U.S. PATENT DOCUMENTS

| | | | |
|---|---|---|---|
| 4,081,846 | 3/1978 | Roscamp et al. | 360/103 |
| 4,636,894 | 1/1987 | Mo | 360/103 |
| 4,819,091 | 4/1989 | Brezoczky et al. | 360/97.01 |
| 4,870,519 | 9/1989 | White | 360/103 |
| 5,019,930 | 5/1991 | Takeya | 360/103 |
| 5,097,369 | 3/1992 | Matsuzaki | 360/103 |
| 5,097,370 | 3/1992 | Hsia | 360/103 |
| 5,220,470 | 6/1993 | Ananth et al. | 360/103 |

Primary Examiner—John H. Wolff

[57] ABSTRACT

The slider is configured with a relatively wide cross-cut relief slot and a longitudinal angled relief slot. In combination, the two slots limit upward air bearing surface force to allow the slider to intermittently contact the disk. By maintaining the slider either in contact with the disk or closely adjacent to the disk, high recording densities are achieved. By ensuring that the slider is only in intermittent contact with the disk, slider and disk wear is kept to an acceptable minimum. The longitudinal relief slot also operates to stabilize the slider and prevent substantial roll affects.

5 Claims, 4 Drawing Sheets

HARD DISK DRIVE HAVING PARTIAL CONTACT MAGNETIC RECORDING SLIDER APPARATUS

BACKGROUND OF THE INVENTION

1. Field Of The Invention

The invention generally relates to hard disk drives and in particular to an improved slider apparatus for use in a hard disk drive.

2. Description Of Related Art

A typical hard disk drive system includes a recording head having magnetic recording transducer mounted at the end of an actuator arm assembly. The actuator arm assembly is adapted to position the magnetic recording transducer over a spinning hard disk to allow magnetic reading and writing operations to be performed on portions of the spinning disk. To facilitate proper positioning of the magnetic recording transducer over the hard disk, the transducer is mounted within a slider positioned at an extreme distal end of the actuator arm assembly. In operation, the slider slides along the spinning hard disk either in direct contact with the disk or at a slight height above the disk.

A primary goal of hard disk drives is to provide a maximum recording density in the hard disk. It has been found that the recording density that can be achieved using a magnetic recording transducer depends on the distance between the recording media of the hard disk and the magnetic recording transducer. From a recording density standpoint, the transducer is ideally maintained in direct contact with the recording media of the hard disk. However, the hard disk typically spins at about 4,000 RPM and continuous direct contact between the slider and the recording media causes unacceptable wear in both the recording media and the slider. Wear occurring in the recording media can result in a loss of data. Wear occurring in the slider can ultimately result in a complete failure of the recording transducer requiring replacement of the slider, as well as loss of data.

To prevent undue wear of the recording media and the slider while still maintaining a high recording density, a bottom surface of the slider is typically configured as an air bearing surface (ABS). High speed rotation of the disk causes a stream of air to flow along the surface of the disk. The ABS of the slider interacts with the flow of air causing the slider to float above the hard disk surface. Hence, while the disk is spinning and the slider is positioned adjacent to the disk, the slider is elevated slightly above the disk substantially eliminating any wear to either the disk or the slider. To achieve adequate lift, the ABS may include a slight ramp formed along a leading edge of the bottom surface of the slider and a pair of rails formed along side edges of the bottom surface of the slider. The ramp allows a portion of air to be drawn underneath the slider. The rails provide a longitudinal conduit for air flow which extends along the entire bottom surface to a rear edge of the slider.

Although the above-described ABS slider design has been effective in preventing wear of the slider and the recording media, optimal recording densities have not been achieved due to separation between the recording media and the magnetic recording transducer of the slider. To achieve higher linear recording densities, the separation between the magnetic recording transducer and the magnetic recording media should be decreased. For the past several decades, attempts to decrease the separation distance has primarily involved improvements to the surface smoothness and flatness of the recording media and improvements to air bearing designs that provide lower and lower recording head/recording media distances. Heretofore, distances of less than two micro-inches have not been achieved.

Although an ABS design maintains the slider elevated above the disk during normal operation, the slider actually contacts the disk during start up and shut down of the disk drive. In such circumstances, the slider and recording media contact in a dedicated landing zone wherein no data is recorded. Because of landing zone contact, the slider and the disk are in contact up to 0.1% of the typical operation time of the hard drive. Hence, a certain amount of wear of the slider is inevitable, even for the ABS design.

Some head designs provide for full contact recording wherein the head and disk are in contact 100% of the operation time of the device. Although high recording densities can be achieved using a full contact approach, considerable head or media wear can occur. In particular, head/disk durability must be increased one thousand fold over that of a conventional ABS system for the full contact approach to have an equivalent durability to that of the air bearing system, wherein the head is in contact with the disk less than 0.1% of the operational time. The thousand fold increase in durability may be difficult or impossible to achieve, resulting in increased wear over the non-contact ABS system resulting in shorter lifetimes for the operational disk.

SUMMARY OF THE INVENTION

From the forgoing it can be appreciated that there is a need to provide an improved slider design for use in hard disk drives. It is a general object of the invention to provide such an improved slider design. It is a particular object of the invention to provide an improved slider which allows for greater recording densities than that of conventional non-contact slider designs while avoiding the wear to the slider and recording media inherent in full contact recording. It is a further object of the invention to provide such an improved slider design which can be easily incorporated into existing hard disk drives without substantial modification to other components of the hard disk drive.

These and other objects of the invention are achieved by an improved slider design having an ABS surface configured to elevate the slider above the spinning hard disk during only a portion of the Lime the disk is spinning, with the slider in intermittent contact with the disk, other than in dedicated landing zones. Preferably, the slider is configured to be in contact with the recording media of the disk between one and ten percent of the operational time of the disk drive. The provision of a slider in intermittent contact with the disk, other than in dedicated landing zones, is hereinafter referred to as "intimate" partial contact recording. By providing a slider which is in near or actual contact with the disk, higher recording densities are achieved as compared to full non-contact slider designs. However, the substantial wear inherent in full contact recording is avoided since the slider is only intermittently in contact with the recording media of the disk. With the slider configured to be in contact, on the average, 1% of the operational spinning time of the disk, a one hundred-fold decrease in wear of the slider and recording media is achieved over the full contact design. However, since the slider need not remain completely elevated above the disk during use, higher recording densities are achieved.

In a preferred embodiment, intimate contact recording is achieved by providing an improved slider having a longitudinal relief slot formed along a bottom (ABS) surface of the slider with the longitudinal relief slot extending longitudinally along a bottom surface of the slider from a front edge to a position intermediate the front edge and a read edge of the slider. A bottom surface of the slider also includes a cross-cut relief slot extending between opposing side edges. The cross-cut relief slot has a width covering a substantial portion of the bottom surface of the slider and covers preferably at least one third of the bottom surface of the slider. The longitudinal relief slot extends rear-wardly beyond a read edge of the cross-cut relief slot. The longitudinal relief slot may be angled with respect to the bottom surface of the slider.

The airbearing surface interacts with a flow of air flowing across a top surface of the disk to provide intermittent contact with the disk. Any slight roughness in the disk creates a slightly uneven airflow with resulting slight variations in airbearing lift. The airbearing surface of the slider is affected by the slight variations in airbearing lift to initiate intermittent contact. More specifically, the longitudinal relief slot and the wide cross-cut relief slot combine to decrease the lift pressure acting on the ABS of the slider causing the slider to intermittently or occasionally contact the recording media of the disk. Furthermore, the provision of the wide cross-cut relief slot and the longitudinal slot, which does not extend along the entire length of the slider, tends to minimize the force of impact when the slider does contact the media surface. In particular, the longitudinal relief slot, which extends only partially along the bottom surface of the slider, minimizes air bearing lift occurring on a center portion of a rear contact pad formed along a rear portion of the bottom surface of the slider. The decrease in lift along the rear portion of the slider causes the front portion to tilt upwardly achieving a relatively high pitch, thereby insuring that when contact with the recording media is made, contact occurs only at the rear bottom portion of the slider where the recording transducer is positioned. When contact between the rear portion of the slider and the disk occurs, the front portion of the slider is pivoted downwardly, thereby increasing air lift and producing an upward force, causing the slider to again rise above the disk. Once airborne, the pitch increases resulting in a lessening in ABS lift which causes the slider to drop slowly and eventually touch the disk again. In this manner, the slider tends to skip along the surface of the disk, contacting the disk only intermittently. Although the front end of the slider may pitch upwardly by a significant amount, the rear end of the slider, containing the magnetic recording transducer, does not rise substantiously above the disk surface, allowing high density recording.

Since the longitudinal relief slot does not extend entirely along the bottom surface of the slider, but terminates at an intermediate position, the rear bottom portion of the slider possesses a flat surface for the conventional mounting, fabrication and operation of a magnetic recording transducer. The longitudinal slot also effectively splits both the front and back air bearing surfaces into opposing halves which achieves improved roll stability for the slider.

The improved slider is easily implemented within an otherwise conventional hard disk drive system with only minor modifications to other components of the drive. Accordingly, the advantages of the invention are achieved with minimal impact on the overall design, fabrication and operation of the hard disk drive. Higher recording densities are achieved are generally possible than using non-contact recording techniques, yet the substantial wear inherent in full contact recording is avoided.

BRIEF DESCRIPTION OF THE DRAWINGS

The invention will be understood more fully from the detailed description given below and from the accompanying drawings of preferred embodiments of the invention which.

DETAILED DESCRIPTION OF THE INVENTION

Referring to the figures, preferred embodiments of the invention will now be described.

Figure 1:
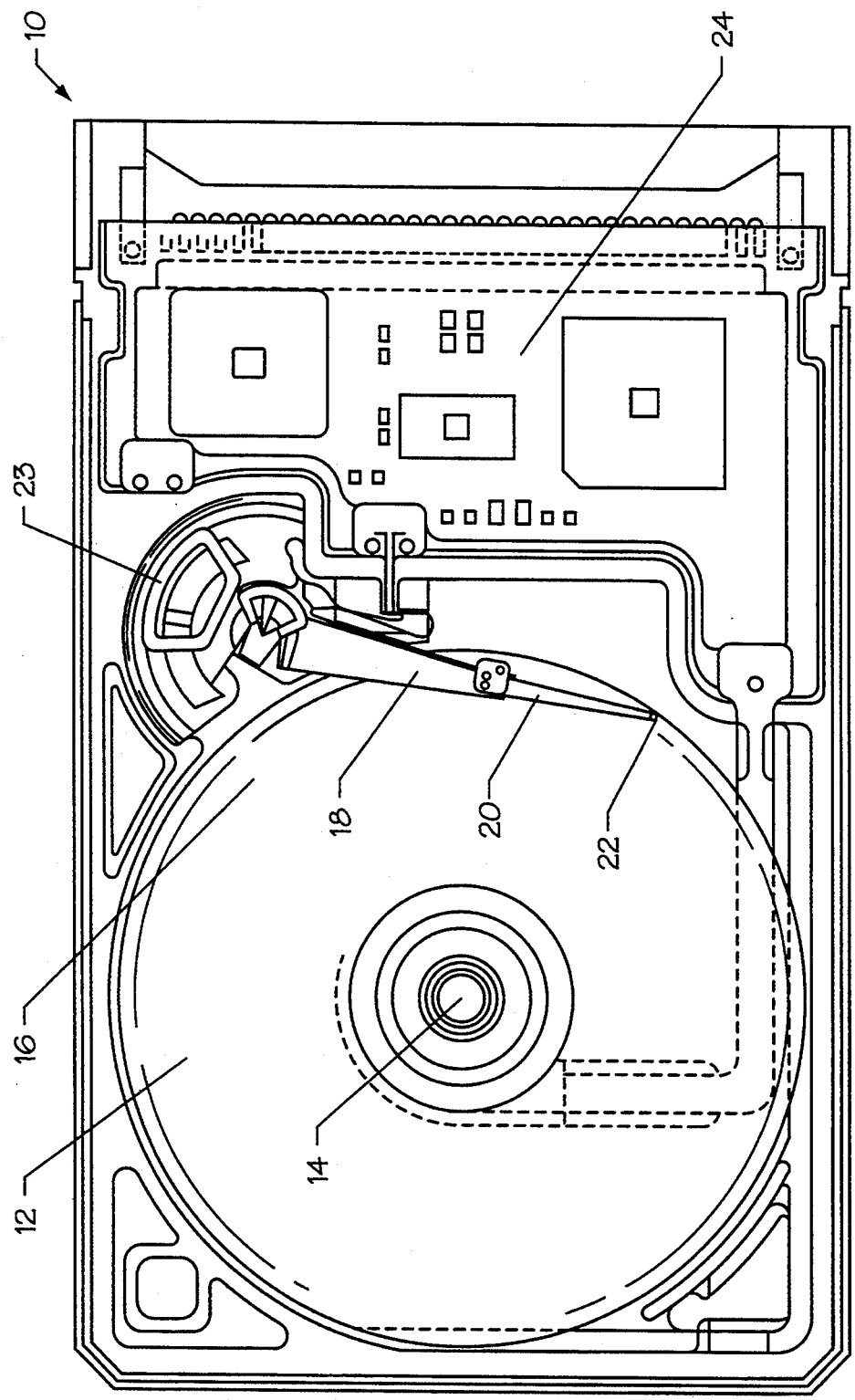
FIG. 1 is a cross-sectional view of a disk drive constructed in accordance with a preferred embodiment of the invention wherein the disk drive includes a slider configured for achieving intermittent contact with a hard disk recording media.

FIG. 1 illustrates a hard disk drive 10 incorporating the intimate contact magnetic recording of the invention. Hard disk drive 10 includes numerous components, only a relevant portion of which will be described herein. Hard disk drive 10 includes a hard disk 12 mounted to a spin motor 14 for high speed rotation therewith. In operation, hard disk 12 typically rotates at 4,000 RPM. The disk may have any of a variety of sizes but it is typically in the 1.3–3.5 inches, preferably 1.8 inches. A topmost surface of the disk forms a magnetic recording media. An actuator arm assembly 16 is mounted adjacent to disk 12. Actuator arm assembly 16 is pivotally mounted such that a distal or free end portion of the actuator assembly is positionable over the disk at various positions throughout a radial range extending from near spin motor 14 to an outermost periphery of the disk, or beyond.

Actuator assembly 16 includes an actuator 18, a flex member 20 and a slider 22, with the slider mounted to an end of flex member 20. Flex member 20 is mounted to an end of actuator 18 by a suspension mechanism. Flex member 20, slider 22 and the associated suspension mechanism together comprise a head gimbal assembly. A voice coil 23 connects to an inner or proximal end of the actuator assembly and operates to pivot the actuator assembly with respect to disk 12 thereby positioning slider 22 at a desired location over the disk, defined by a radial distance from the center of the disk.

Slider 22 includes a magnetic recording transducer along a bottom rear pad (not shown in FIG. 1) which generates a magnetic field for reading and writing data to and from disk 12. Electrical connection means (also not shown) connect the magnetic recording transducer to a control circuit 24 which controls operation of the magnetic recording transducer. Control circuit 24 also controls operation of voice coil 23 to position the magnetic recording transducer at a desired location over the disk and controls spin motor 14 to spin the disk at a desired speed. To record data onto disk 12, control circuit 24 transmits signals to spin motor 14 causing disk 12 to spin at a desired rate and transmits signals to voice coil 23 causing actuator assembly 16 to pivot by a desired amount, thereby placing the magnetic recording transducer of slider 22 over a selected location of disk 12. Then, control circuit 24 transmits electrical signals to the magnetic recording transducer causing the transducer to generate magnetic fields which interact with the recording media of disk 12 resulting in data being recorded therein. The detailed structure, function and operation or most of the components illustrated in FIG. 1 are not pertinent to the invention and will not be described in further detail herein.

Figure 2A:
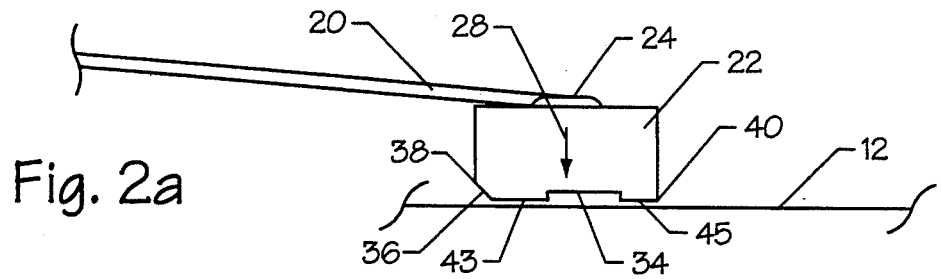
FIG. 2a is a side view of a portion of an actuator arm assembly including an improved slider shown in an elevated position above a disk.
Figure 2B:
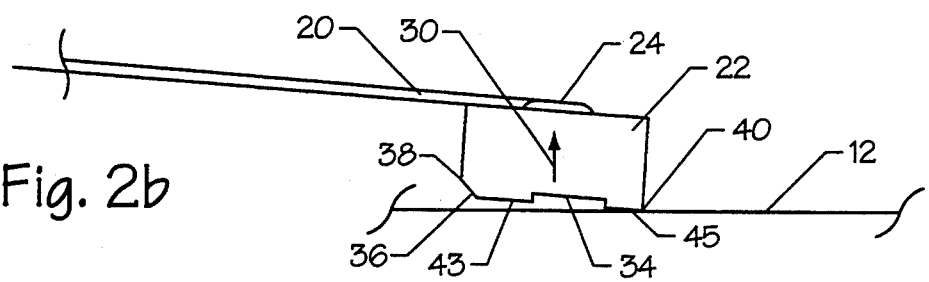
FIG. 2b is a side view of a portion of an actuator arm assembly including an improved slider shown in contact with the disk.

Referring to the remaining figures, a detailed description of the configuration of slider 22 will now be provided. FIGS. 2a and 2b provide a side view of slider 22 mounted to flex member 20. Slider 22 is pivotally mounted to a remote end of flex member 20 by a pivot mount mechanism 24 allowing slider 22 to pivot or pitch with respect to flex member 20. Flex member 20 is mounted to actuator 18 (FIG. 1) with a suspension mechanism allowing slider 22 to be raised or lowered slightly, with respect to disk 12.

A bottom ABS surface 26 of slider 22 defines an air bearing surface which interacts with a flow of air occurring along a top surface of disk 12 to provide a lifting force tending to elevate slider 22 above disk 12. In FIG. 2a slider 22 is shown fully elevated above disk 12 with no portion of the slider contacting the disk. FIG. 2b illustrates slider 22 in contact with disk 12 wherein a rear portion of bottom surface 26 is in direct contact with disk 12. The flow of air which interacts with ABS surface 26 is produced by high speed rotation of disk 12. However, for any disk surface, other than an ideal perfectly smooth surface, roughness within the disk surface causes a slightly uneven flow of air. ABS surface 26 is affected by variations in airbearing lift caused by the slightly uneven airflow. It is believed that the slight variations in airbearing lift caused by the roughness of the disk surface is sufficient to initiate slight vertical and pivoting movement of the slider resulting in intermittent contact with the disk. The scale of the roughness of a typical hard disk is small compared to the size of the slider. As such, the slight variations in airflow merely perturb motion of the slider sufficient to cause slight vertical and pivoting displacement providing fairly gentle contact between the slider and the disk. A disk having roughness substantially on the same scale as the slider could result in erratic motion of the slider. However, a typical disk surface has an average roughness of 100 Angstroms or less and more typically on the order of 10 to 20 Angstroms. Thus, for any slider having dimensions fairly large compared to the average surface roughness, smooth perturbations are achieved and erratic motion is avoided. In general, surface roughness is measured as a mean distance between bumps or protuberances of the surface of the disk taken parallel to the surface of the disk.

As a result of the slight perturbations caused by the uneven airflow, slider 22 is intermittently displaced from the fully elevated configuration of FIG. 2a to the partial contact configuration of FIG. 2b. In other words, slider 22 tends to skip along the surface of disk 12 spending a portion of time in the elevated position of FIG. 2a and a portion of time in direct contact with the disk as shown in FIG. 2B. The intermittent contact with disk is termed "intimate" contact. ABS surface 26 is configured to interact with the flow of air along the surface of disk 12 to cause slider 22 to skip along the disk. When in the configuration of FIG. 2a, ABS 26 interacts with the flow of air (as modulated by the disk surface) to yield a lift pressure that is at times insufficient to overcome a downward gram-load weight of slider 22 resulting in a net downward force on slider 22. The net downward force is illustrated in FIG. 2a by downwardly pointed arrow 28. When in the configuration of FIG. 2b, ABS surface 26 interacts with the flow of air to increase the lift pressure by an amount sufficient to overcome the downward gram-load force, thereby yielding a net upward force on slider 22 causing the slider to float upwardly from the disk. The net upward force is illustrated in FIG. 2 by upwardly facing arrow 30. The change in airflow also causes the pitch angle of the slider to change. In particular, while the slider is elevated, the rear end of the slider pivots downwardly. Once the rear pad touches the disk, the increase in upward force causes the rear portion of the slider to pivot upwardly slightly. The front portion of the slider pivots upwardly and downwardly, typically in a direction opposite to the pivoting direction of the rear end of the slider. Furthermore, although the displacement of the rear end of the slider is very slight, the pivoting displacement of the front end of the slider is more significant. By ensuring that the rear portion of the slider containing the magnetic recording transducer is displaced only slightly away from the disk, high magnetic recording densities are achieved. A more substantial deviation of the front portion of the slider does not significantly affect the magnetic recording densities.

Hence, the slider is subject to two general displacements, up and down displacement of the entire slider and pivoting displacement of the rear end of the slider relative to the front end of the slider. The up and down movement of the slider is accommodated by the flexing of flex member 20. Pivoting of the slider is accommodated by the pivot attachment of the slider to the flex member. The ABS surface is configured to ensure that most of the displacement of the slider occurs at the front portion of the slider, with the rear portion of the slider containing the magnetic recording transducer being displaced only slightly upwardly or downwardly with respect to the disk.

In this manner, slider 22 tends to oscillate between an elevated position and a contact position. However, the oscillation may or may not be a periodic oscillation. Slider 22 does not necessarily spend an equal amount of time in the configuration of FIG. 2a as in the configuration of Figure 2b. The actual displacement of slider 22 with respect to the disk may depend, in a complicated way, on the interaction of ABS surface 26 and the flow of air modulated by the surface topography of the disk, causing a somewhat irregular skipping motion. Nevertheless, as will be described in more detail below, ABS surface 26 is configured to provide contact between slider 22 and disk 12 only between one and ten percent of the time that slider 22 is positioned over the spinning disk. Hence, slider 22 remains elevated above disk 12 ninety to ninety-nine percent of the operational time of the hard drive. The motion of the slider will be described in more detail below following the description of the configuration of ABS surface 26.

Figure 3:
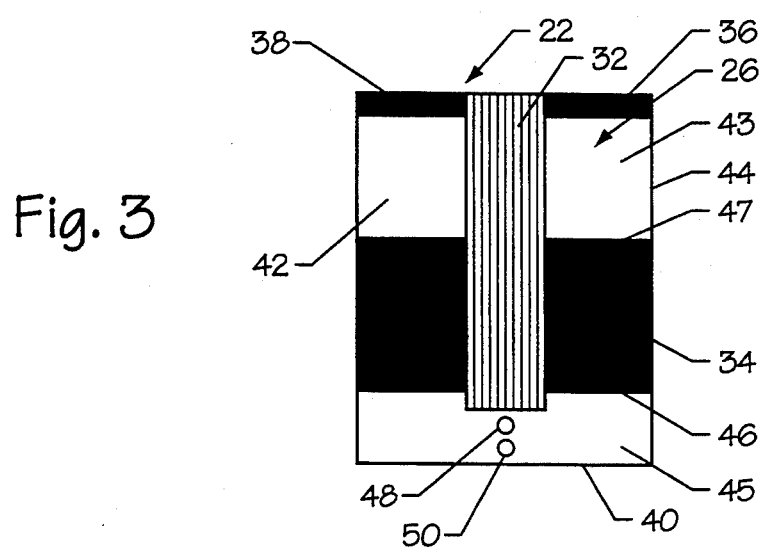
FIG. 3 is a bottom view of the slider of FIGS. 2a and 2b.
Figure 4A:
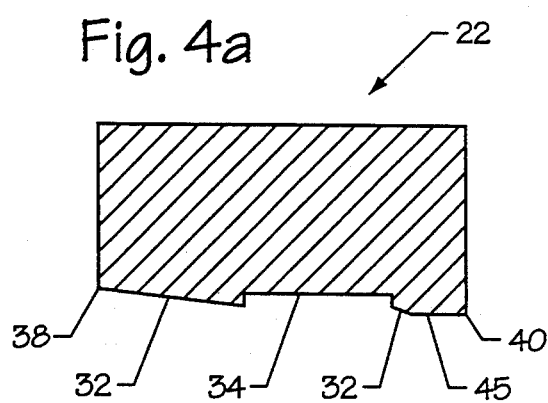
FIG. 4a is a side cross-sectional view of the slider of FIGS. 2a and 2b, having an angled longitudinal relief slot.

The configuration of ABS surface 26 is shown most clearly with reference to FIGS. 3 and 4a. FIG. 3 provides a bottom planar view of ABS surface 26. ABS surface 26 is a generally flat smooth surface cut by a longitudinal relief slot 32, a cross-cut relief slot 34 and a leading edge ramp 36. Longitudinal relief slot 32 extends from a leading edge 38 of slider 22 to a position near, but offset from a rear edge 40 of slider 22. Longitudinal relief slot 32 extends along a longitudinal axis of slider 22 generally parallel to tangent lines of the hard disk. Leading edge ramp 36 does not extend along the center portion of the leading edge cut by longitudinal slot 32.

Cross-cut relief slot 34 extends laterally across slider 22 perpendicular to longitudinal relief slot 32 and generally perpendicular to tangent lines of the disk. Cross-cut relief slot 34 extends between opposing side edges 42 and 44. Cross-cut relief slot 34 subdivides ABS surface 26 into a front pad 43 and a rear pad 45 with the front pad extending from side edge 44 of cross-cut relief slot 34 to leading edge 38 and with the rear pad extending from a rear edge 46 of cross-cut slot 34 to trailing edge 40 of the slider.

The magnetic recording transducer is mounted within a rear portion of slider 22 with a pair of magnetic poles 48 and 50 formed on the ABS surface. Internal components (not shown) within slider 22 operate to generate magnetic fields using poles 48 and 50 in response to signals received from control circuit 24 (FIG. 1).

Longitudinal relief slot 32 is preferably angled with respect to flat portions of ABS surface 26 by at least 2 degrees. Hence., the depth of longitudinal relief slot 32 within slider 22 is greater at leading edge 38 than elsewhere along the axis of slider 22. Leading edge ramp 36 does not extend through the central portion of the slider having longitudinal relief slot 32 and hence is not shown in FIG. 4a. The angle of longitudinal relief slot 32 is best seen in FIG. 4a which provides a side cross-sectional view of slider 22 taken along a central longitudinal axis of the slider, excluding internal components. FIGS. 2a and 2b provide a side elevational views of slider 2 wherein the longitudinal relief slot is obscured from view and only the cross-cut relief slot and the leading edge slider are visible. As can be seen from FIG. 4a, cross-cut relief slot 34 extends somewhat more deeply into slider 22 than longitudinal relief slot 32.

In use, longitudinal relief slot 32 and cross-cut relief slot 34 together operate to affect the flow of air underneath ABS surface 26 to, in part, limit the amount of upward lift, causing the skipping motion illustrated in FIGS. 2a and 2b. More particularly, longitudinal relief slot 32 provides a conduit for air to pass from leading edge 38 into cross-cut relief slot 34. As noted above, longitudinal relief slot 32 does not extend the entire length of slider 22, but terminates in a rear pad area. Thus, the conduit for air does not extend along the entire bottom surface of the slider. In previous ABS designs which have incorporated a longitudinal air conduit by providing narrow rails along side edges of the slider, the conduit extends along the entire bottom length of the slider. As a result of the previous designs, a fairly substantial ABS lift is achieved, which maintains the slider at a height above the spinning disk at all times, other than when the disk is not spinning or is spinning rather slowly. The wider cross-cut relief slot and the truncated longitudinal relief slot of the invention together minimize the overall ABS pressure by a sufficient amount to bring the slider into actual contact with the disk at intermittent times.

More specifically, the configuration minimizes air bearing lift on a center portion of rear contact pad 45. This brings rear contract pad 45 into occasional contact with the disk thereby positioning poles 40 and 50 in direct contact with the disk. The configuration wherein the rear contact pad is in contact with the disk is illustrated in FIG. 2b. Once the rear contact pad touches with the disk, the air flow beneath the slider is interrupted and the slider pitch is reduced increasing the amount of ABS force beneath slider 22 causing a net upward force, illustrated by arrow 30 of FIG. 2b. This upward force lifts the slider into the air to the configuration of FIG. 2a. However, once the rear contact pad is no longer in contact with the disk, the pitch of the slider increases causing a decrease in the upward ABS force, and as discussed above, slider 22 undergoes a net downward force causing the slider to again drop into contact with disk 12. As noted above, the changes in air flow under the slider cause the slider to both be elevated relative to an axis parallel to the disk and be displaced vertically with respect to the disk. The combination of movements ensure that the slider is in actual contact with the disk for only a small fraction of the total operational time and further ensure that, when contact with the disk is made, minimal force is imparted to the disk, thereby resulting in minimal wear. As noted above, the configuration of the ABS surface of the slider of the invention ensures that the rear pad containing the magnetic recording transducer is displaced only slightly above the disk. The front portion of the slider containing the front pad pivots upwardly and downwardly by a much more significant amount. In general, the average pitch of the slider is much larger in scale than the roughness of the disk surface, discussed above. As a result, the uneven airflow primarily affects the rear pad rather than the front pad, and contact between the head and disk is primarily confined to the rear pad.

Longitudinal relief slot 32 is configured, as shown, to extend only slightly into the rear contact pad thereby leaving a sufficient flat surface for mounting poles 48 and 50 in accordance with conventional techniques and to ensure that the upward ABS pressure is greatly increased when the rear pad is in contact with the disk.

As noted, longitudinal relief slot is primarily provided to modify the flow of air to achieve the skipping intimate contact illustrated in FIGS. 2a and 2b. However, the provision of longitudinal relief slot 32 additionally helps to prevent roll of slider 22. In effect, longitudinal relief slot 32 divides front pad 43 into left and right halves and partially divides rear pad 45 into left and right halves. The longitudinal splitting of the front and rear pads into left and right sides reduces the overall tendency of slider 22 to roll to the left or the right.

Another advantage of the invention is that a drive configured with the improved slider design has greater resistance to shock damage. With conventional hard drives, a jarring of the disk drive can cause the slider to impact with the disk, leaving an imprint in the disk, a phenomena referred to as "head slap". With the invention, the slider is designed to impact the disk in normal use, and any jarring of the hard drive, will not likely create any imprint within the disk.

Figure 4B:
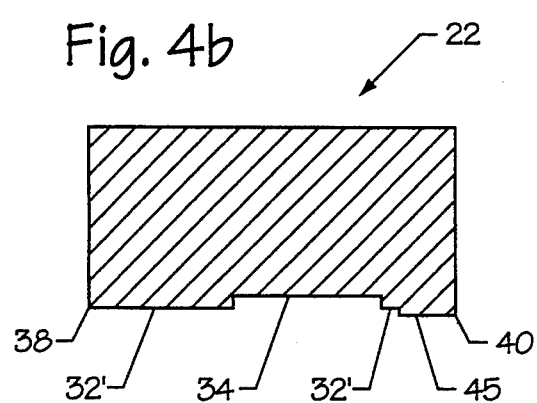
FIG. 4b is a side cross-sectional view of an alternative embodiment of the slider of FIGS. 2a and 2b, having a straight longitudinal relief slot.

FIG. 4b illustrates an alternative embodiment of the invention wherein the longitudinal relief slot is not angled with respect to the bottom surface of slider 22 but maintains a constant depth within a slider. As a result of the slightly different configuration, the airflow beneath slider 22 is somewhat different for the configuration of FIG. 4b than that of FIG. 4a. Nevertheless, the general advantages of the invention are likewise achieved for the straight longitudinal relief slot of FIG. 4b. In FIG. 4b, the longitudinal relief slot is identified by reference numeral 32'.

In FIGS. 4a and 4b, the cross-cut relief slot is shown as having a greater depth than the longitudinal relief slot. This need not be the case and for certain configurations the cross-cut slot may have a lesser depth than the longitudinal slot. Specific configurations may vary. With the foregoing in mind, the following exemplary specifications are provided. Slider 22 has an overall length of 20 mil. and a width of 16 mil. Rear contact pad had a width of 4 mil. and front contact pad has a width of 8 mil. Longitudinal relief slot 32 has a width of about 3 of 4 mil. and a length of 17 mil. Cross-cut relief slot has a width of 8 mil. Longitudinal relief slot 32 is cut to an angle of 2 degrees. The slider has an overall contact area of 16 mil. by 2 mil. for a 32 square mil. area The maximum contact force is 34 pounds per square inch (psi) with the maximum contact force occurring at less than 10 percent of the overall operational time.

As can be appreciated from these dimensions, the size of the slider is quite small in comparison with conventional sliders which may have a height of 16 mil, a width of 63 mil and a length of 80 mil. An actuator assembly having a slider with the exemplary dimensions listed above, achieves a stiffer suspension because of the extremely low surface area. The stiffer suspension tends to advantageously increase a resonant frequency inherent in the actuator assembly.

Figure 5:
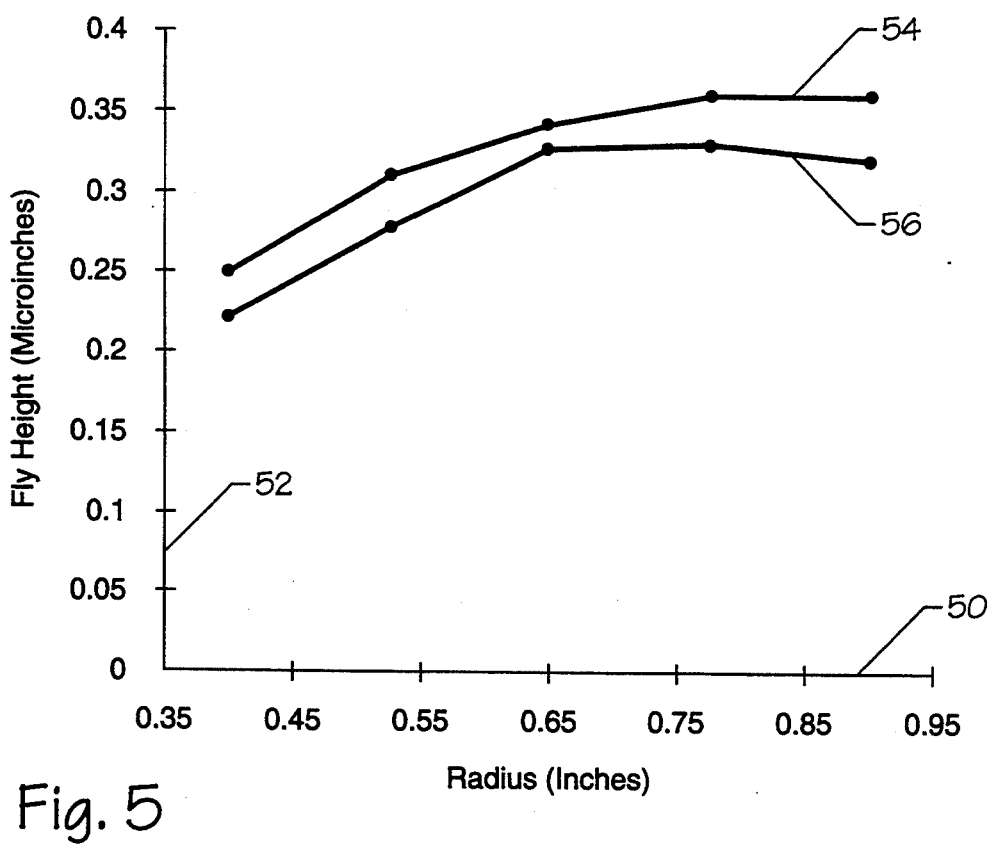
FIG. 5 is a graph illustrating slider fly height as a function of radial distance from the center of a hard disk for the slider illustrated in FIGS. 2a, 2b and 3, operating at a 0.5 gram load over a disk spinning at 4,000 RPM.
Figure 6:
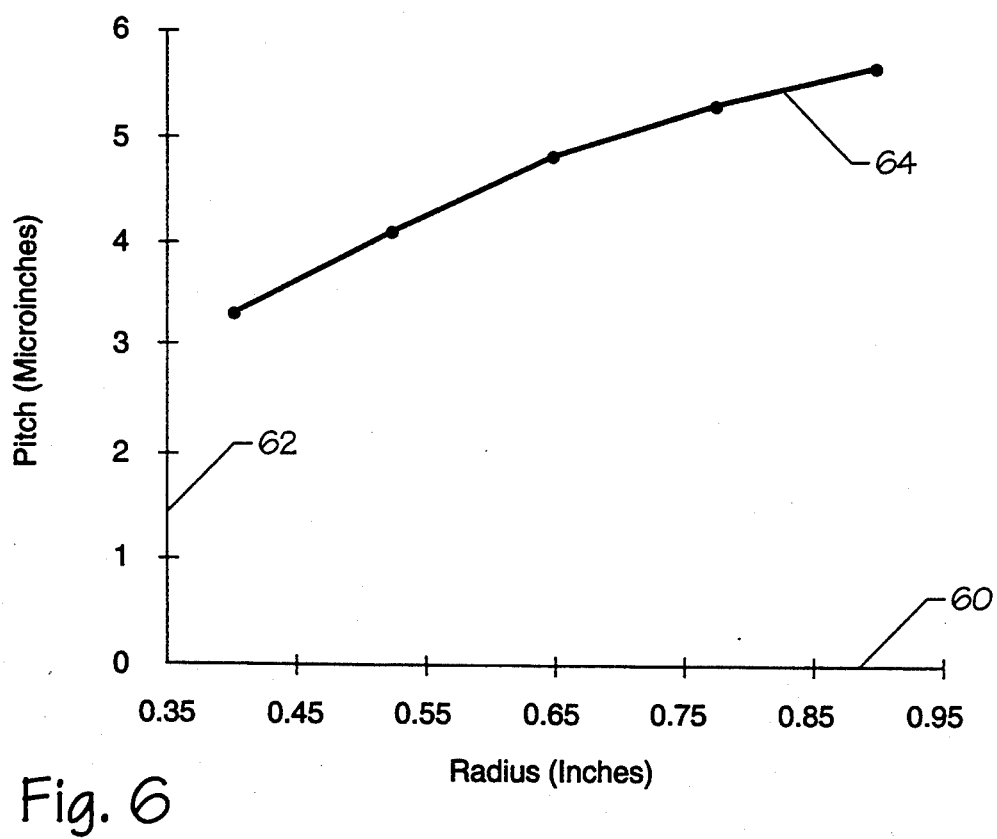
FIG. 6 is a graph illustrating slider pitch versus the radial distance from the center of the spinning disk for the slider of FIGS. 2a, 2b and 3.
Figure 7:
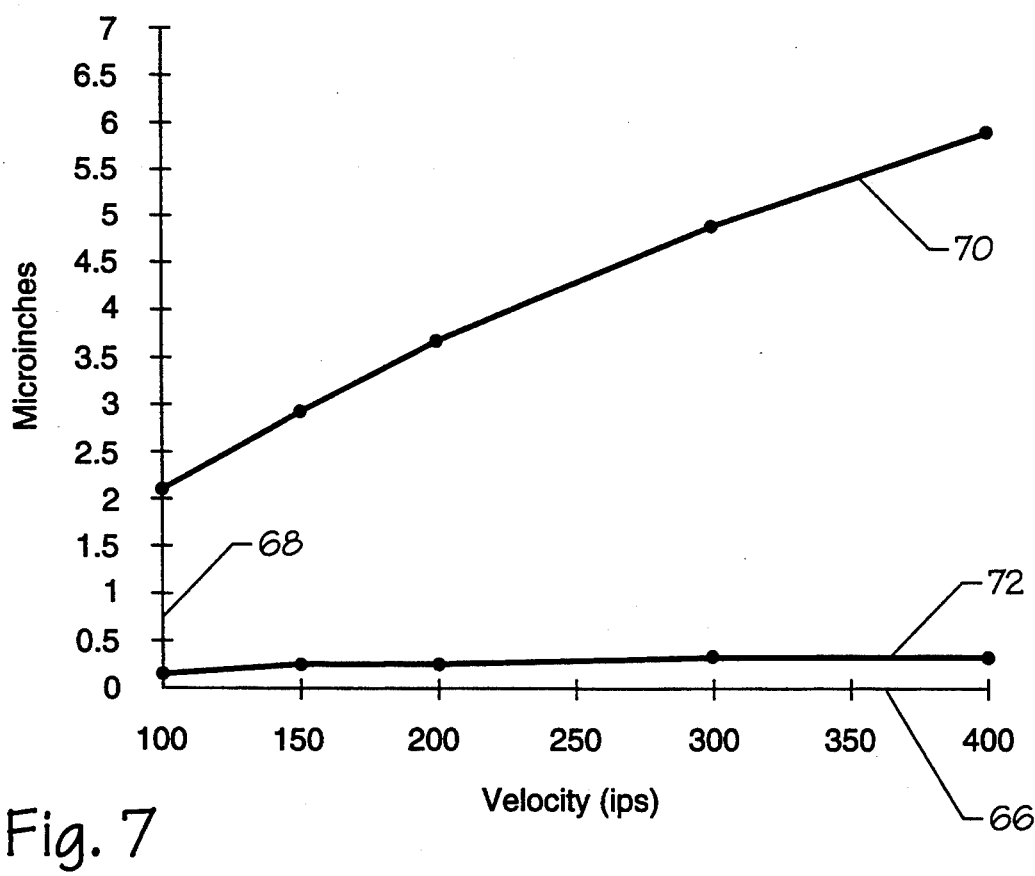
FIG. 7 is a graph illustrating pitch and gap fly height versus disk velocity for the slider of FIGS. 2a, 2b and 3.

Performance specifications for a slider having the dimensions described above have been modeled with results illustrated in Table I and in FIGS. 5, 6 and 7.

TABLE I

| Gap Radii Inches | Gap Skew Degrees | Fly Height Uinches | Pitch Uinches | Roll Urad |
| --- | --- | --- | --- | --- |
| 0.400 | −5.0 | 0.25 | 3.4 | −2.3 |
| 0.525 | 1.4 | 0.31 | 4.2 | −2.0 |
| 0.650 | 6.5 | 0.34 | 4.9 | 1.7 |
| 0.775 | 10.9 | 0.36 | 5.4 | 5.5 |
| 0.900 | 15.0 | 0.36 | 5.8 | 9.0 |

In Table I, performance parameters are described with respect to a gap, wherein the gap is the location between poles 48 and 50 of the rear pad of the slider. In the configuration shown in the drawings, the gap is on axis with the slider. However, the gap can be alternatively positioned to one side or to the other, in accordance with conventional techniques. Table I provides, gap skew, gap fly height, pitch and roll as a function of the distance of the gap from the center of the hard disk. The gap skew refers to the angle of the longitudinal axis of the slider with respect to tangents of the hard disk. Gap fly height refers to the height of the gap above the hard disk. Pitch refers to the vertical displacement of the leading edge of the slider with respect to the trailing edge of the slider. Roll refers to the left-right tilt of the slider about the longitudinal axis of the slider. The parameters of Table I are provided for a disk spinning at 4,000 RPM at sea level with a 0.5 gram load provided to the slider. As can be seen from Table I, the listed parameters vary somewhat significantly as a function of the gap radius. In general, the pitch values shown in Table I are somewhat greater than corresponding pitch values for a conventional slider and the roll values are somewhat less than that of a conventional slider, verifying that a greater pitch is achieved and less roll occurs. As noted, the greater pitch is desirable for ensuring that the rear contact pad contacts the disk with fairly minimal contact force, then immediately lifts upwardly. Less roll is desirable to limit wear of the slider and the recording media and to maintain high recording densities.

FIG. 5 illustrates fly height as a function of radial gap distance for a radial range from 0.35 to 0.95 inches. The radial distance is shown along horizontal axis 50 and the fly height, in micro-inches, is shown along vertical axis 52. Fly height is shown for two positions on the slider. Curve 54 illustrates nominal fly height of the gap. Curve 56 illustrates the nominal "lowest point" fly height. Lowest point fly height refers to the distance between the lowest point on the slider and the disk. Because of roll of the slider, the lowest point on the slider differs from the actual gap. The fly heights illustrated in FIG. 5 are equilibrium or nominal fly heights. Actual fly height varies as a function of time as the slider skips along the disk. The minimum fly height is, of course, zero.

The data for FIG. 5 was obtained by modeling the slider illustrated in FIG. 3 for a disk spinning at 4,000 RPM with a 0.5 gram load applied to the slider.

FIG. 6 illustrates pitch as a function of gap radius. Gap radius is illustrated along horizontal access 60 pitch and micro inches is illustrated along vertical access 62. Curve 64 shows pitch as a function of gap radius for the aforementioned slider operating with a disk spinning at 4,000 RPM and having a 0.5 gram load.

FIG. 7 illustrates pitch and gap fly height as a function of the velocity or speed of the disk. In FIG. 7, velocity is represented in inches per second (ips) with 400 ips corresponding to about 8,000 RPM for a 1.8 inch diameter disk with a slider positioned at a radial distance of about 0.4775 inches. In FIG. 7 the velocity axis is identified by reference numeral 66 with vertical axis 68 providing height in micro-inches. The pitch angle as a function of velocity is represented by curve 70 with the gap fly height represented by curve 72. As can be seen from FIG. 7, the fly height of the gap varies only slightly for increasing velocity. Pitch however increases more substantially. With a rotating disk, disk velocity with respect to the slider increases with radial distance, that is, for a disk spinning at a constant speed the velocity with respect to the slider is greater near an outer diameter of the disk than near an inner diameter of the disk.

The slider of the invention is fabricated and mounted using primarily conventional slider fabrication techniques and materials. However, one or two modifications may be required. Typical sliders operate with a gram load of three or more grams. The slider of the invention operates best with a gram load of 0.5 grams. A corresponding modification may be required in the flex member and in the suspension mechanism connecting the flex member to the actuator to account for the lesser gram load. However, fairly conventional gimbal mounting mechanisms may be employed.

Since the ear contact pad is in actual contact with the disk at least a portion of the time, pole tip smearing is possible. Accordingly, the pole tips are preferably fabricated from a hard sputtered material such as Sendust, rather than soft plated nickel iron currently used in conventional non-contact thin film heads. The ABS surface of the slider is preferably fabricated from a super-smooth surface and the recording media of the disk should likewise be composed of a highly durable smooth surface. In this regard the ABS surface can be fabricated by sputter deposition on super-smooth glass or carbon substrates. Otherwise, conventional fabrication, mounting and operational techniques may be employed.

The operational parameters described above relate to one specific slider configuration. Increasing the dimensions of the ABS surface may require an increase in the load needed to achieve a desired fly height. Increasing the front pad dimensions relative to the rear pad dimensions will likely increase the operating pitch of the slider for a given load value. The dimensions described herein are not necessarily optimal and the actual dimensions are selected in accordance with the teachings of the invention to achieved desired performance specifications. Further with regard to FIGS. 5, 6 and 7, it should be noted that there is some uncertainty in the numerical modeling results as the distance between the recording head and the media become very small.

The relief slots can be fabricated by sawing or grinding but may alternatively be formed using etching techniques. If produced using grinding or sawing, an angled longitudinal slot is preferred as such is easier to achieve using a saw or grinder than a straight relief slot. For an etched surface, the straight longitudinal relief slot is preferred as such is easier to fabricate using etching techniques.

What has been described is a improved hard disk drive wherein the recording head is placed in partial intermittent contact with the hard disk media to achieve high density recording with minimal wear. Using conventional materials, the wear over a five year life for the recording head is expected to be less than half a micron. Using the improved slider of the invention, either horizontal or longitudinal recording can be employed by mounting an appropriate magnetic recording transducer within the slider. The aforementioned pole tip smearing would primarily occur only using a longitudinal recording head and would not likely be a factor for perpendicular recording heads. With regard to the drawing figures, it should be noted that some of the dimensions are exaggerated to more clearly illustrate components of the invention.

What is claimed is:

1. In a slider for use with a hard disk drive wherein the slider has a bottom surface with a length extending between leading and trailing edges and a width extending between opposing side edges of the slider, an improvement comprising:
    a longitudinal relief slot provided within the bottom surface of the slider parallel to the opposing side edges, the longitudinal relief slot having an angled depth extending along the bottom surface of the slider from the leading edge to a position intermediate the leading edge and the trailing edge, with the longitudinal relief slot extending further into the slider at the leading edge then at the position intermediate the leading and trailing edges, the longitudinal relief slot also having a width which is at least one third of the length of the bottom of the slider: and
    a cross-cut relief slot extending along the bottom surface of the slider between the opposing side edges.

2. The improvement of claim 1, wherein the angled of the longitudinal relief slot is between two degrees and ninety degrees relative to the bottom surface of the slider.

3. A hard disk drive system comprising:
    a disk having a magnetic recording media;
    means for spinning said disk;
    an actuator assembly, mounted adjacent to an outer periphery of said disk, said actuator assembly having a pivotably mounted actuator, a flex member connected to a distal end of said actuator, a slider mounted to a distal end of said flex member, with said slider having a bottom surface with a length extending between leading and trailing edges and a width extending between opposing side edges;
    means for pivoting said actuator assembly relative to said disk to position said slider above a track of said disk;
    a longitudinal relief slot formed within said bottom surface of said slider parallel to said opposing side edges, said longitudinal relief slot having an angled depth which extends along said bottom surface of said slider from said leading edge to a position intermediate the said leading edge and a said trailing edge of the said slider, with said longitudinal relief slot extending further into said slider at said leading edge then at said intermediate, position said longitudinal relief slot also having width which is at least one third of said length of said bottom of said slider;
    a cross-cut relief slot formed within said bottom surface of said slider, said cross-cut relief slot extending between said opposing side edges perpendicular to said longitudinal relief slot;
    control means for controlling operation of said means for spinning said disk to spin said disk at a desired rate, for controlling said means for pivoting said actuator assembly to position said slider at a desired position over said disk relative to a center of said disk, and for controlling said magnetic recording transducer to read data from, and write data to, said magnetic recording media of said disk.

4. The hard disk drive system of claim 3, wherein said angled depth is between two degrees and ninety degrees relative to said bottom surface of said slider.

5. The hard disk drive system of claim 4 wherein a width of said longitudinal relief slot is at least one third of said length of said bottom of said slider.

* * * * *